Sept. 17, 1946.　　　K. ENGLER ET AL　　　2,407,636
DRIER
Filed May 12, 1944
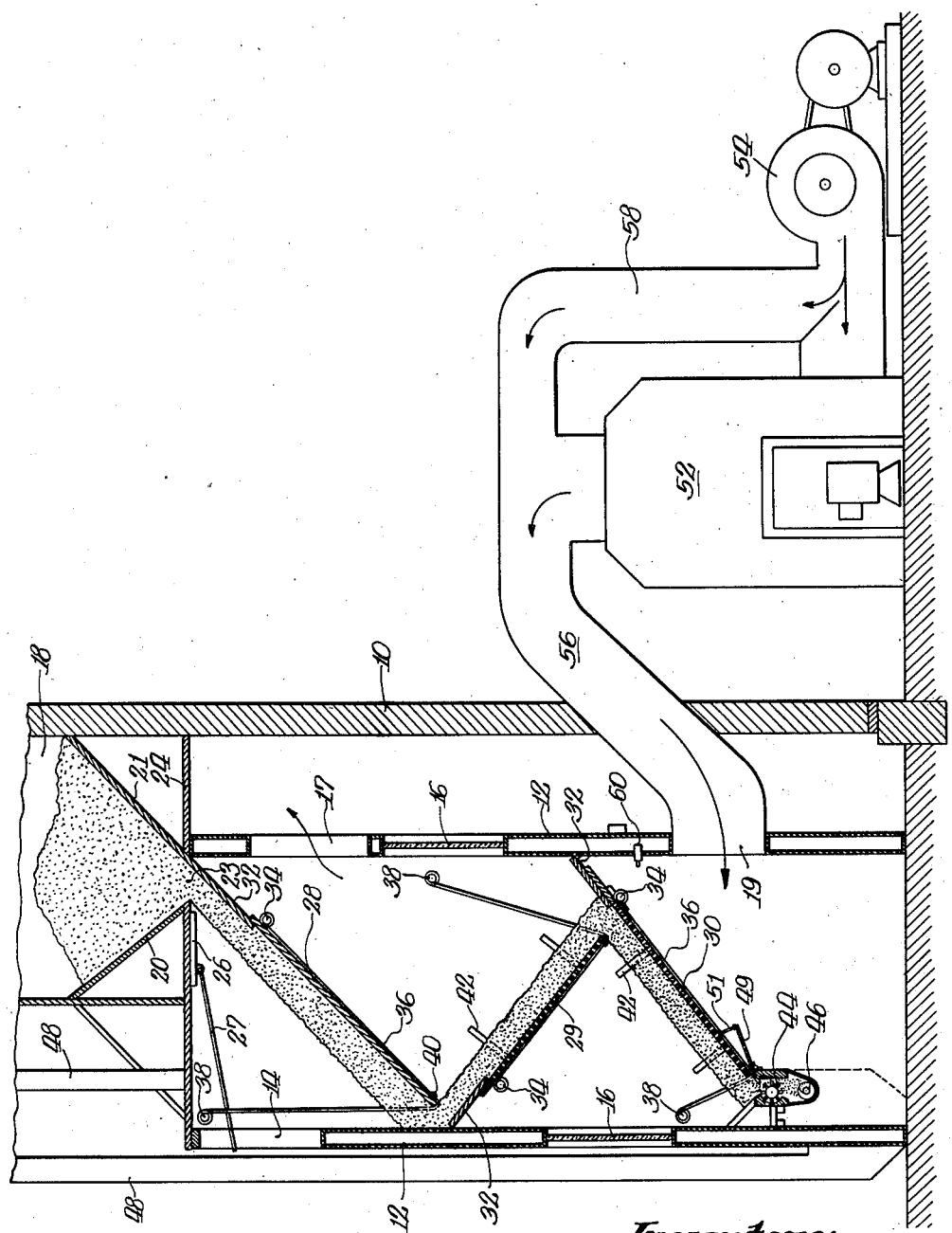
Inventors:
KYLE ENGLER
EDGAR L. BARGER
ARTHUR H. THOMPSON, DECEASED,
BY REBECCA GEORGE THOMPSON
ADMINISTRATRIX

UNITED STATES PATENT OFFICE 2,407,636

DRIER

Kyle Engler, Fayetteville, Ark., Edgar L. Barger, Ames, Iowa, and Arthur H. Thompson, deceased, late of Fayetteville, Ark., by Rebecca George Thompson, administratrix, Fayetteville, Ark., assignors to board of trustees of the University of Arkansas, Fayetteville, Ark.

Application May 12, 1944, Serial No. 535,240

5 Claims. (Cl. 259—180)

Our invention is a drier for rice and other grains and seeds, or any product for which it may be useful.

It is our purpose to provide a simple, practical structure at a cost so low it will be available to individual farmers.

It is particularly our object to provide in a tower type drier, a series of inclined trays, so constructed and mounted and adjustable that the product being dried may be controlled as to flow and depth and be subjected to moisture removing air.

Especially we provide means for mounting and adjusting the trays, both slidably and pivotally for controlling the depth of the material on them and the speed of flow.

Other objects will appear as our description proceeds.

We shall describe our drier as used for drying rice, but do not limit it to such use.

An illustrative embodiment of our invention is shown in the drawing herewith, which is a vertical, sectional view, parts being shown in elevation.

The usual method of harvesting rice, in Arkansas for instance, is to cut it with a binder, and later thresh it from the shock. Binder crews of four to six men can bind and shock 15 to 20 acres a day, and threshing crews of 12 to 15 men can thresh from 1,000 to 2,000 bushels per day.

In view of the dwindling farm labor supply, any method of decreasing the man power required for harvesting rice would, at this time, release farm labor for other purposes, ensure crop harvest, and effect economies of production.

The combine is a logical machine to reduce man-power requirements. Compared to the binder-thresher method, two or three men using a combine can cut and thresh 10 to 15 acres a day at less than one-half the cost of the binder-thresher method; and grain losses can be reduced from a range of 2 to 10 percent to below 2 percent.

But, regardless of the harvesting method used, the grain must be dried before placing it in storage. With the binder-thresher method the grain dries in the shock; with the more economical combine method, the grain must be artificially dried. If rice is harvested when it has a moisture content much lower than 20 percent, the kernels frequently become so checked or cracked that many of them break in milling.

The necessity of artificially drying rice harvested with a combine is, so far, the greatest obstacle to the use of the combine in Arkansas because adequate facilities for artificially drying before storing are not available. It is impossible for rice mills to install driers of sufficient capacity to handle more than a small part of the total Arkansas rice crop, and the present available commercial rice driers are too large and expensive for the individual farmers to own.

In an effort to combat the problem of limited drying facilities, we have designed and built the farm-sized rice drier described herein. The drier is a continuous-flow, tower-type drier. The rice enters the drier from an overhead hopper bin, and flows through the drier over inclined trays. The rate of flow of rice through the drier is controlled by a fluted feed roll at the lower end of the bottom tray. An auger beneath the fluted feed carries the grain from the drier to a cup elevator, which elevates the dried grain to overhead storage bins or back to the drier hopper.

10 indicates the wall of the adjacent storage building. The tower 12 is preferably built with insulated walls, not shown in detail. The walls may be prefabricated in sections. The walls of the tower preferably have the door 14 and inspection windows 16, an upper exhaust opening 17 and a lower air intake opening 19.

Rice 18, from the combine, for instance, is elevated to a bin 20 with a hopper bottom 21 and flows by gravity through a suitable opening 23 in the tower top 24 past the adjustable shut-off gate 26 and then over a series of adjustable inclined trays 28, 29 and 30. The gate 26 is controlled by a rod 27.

The top tray 28 serves to regulate the depth of grain on the next tray 29 below it. It is imperforate and serves to direct the air toward the exhaust opening 18. The trays 29 and 30 are drying trays and are perforated in such a manner that air can pass upward through the tray but grains will flow freely over the trays and will not fall through when the tray is in the normal operating position.

At the upper end of each tray, an inclined plate 32 projects inwardly from the wall and forms, as it were, an extension of the tray. These plates 32 are fixed and their lower ends are so spaced above the cross members 34, as to permit the trays to slide on the cross members 34, and also to rock thereon to a limited extent. The cross members 34 are journaled in the walls of the tower, so that they may be rotated. Outside the tower, they have cranks, not shown, and ratchets and pawls for holding in fixed adjustment, also not shown.

Fixed to and wound on the cross members 34 are ropes or cables 36, which extend downwardly on the undersides of the trays and around the ends thereof and thence upwardly to similarly journaled cross members 38. The cables 36 are preferably fastened to the trays near their lower ends as indicated at 40.

By rotating the cross members 34, the trays may be slid telescopically with relation to the plates 32. Thereby the opening through which the rice or the like travels at the lower end of each tray is regulated, and the depth or level of the grain on the tray is controlled.

By winding the cables on the cross members 38, the trays are tilted at their lower ends, rocking around the cross members 34 for regulating the angularity of the trays.

By this adjustment of angularity, we are able to maintain the rice or other material being handled at a uniform depth over the full surface of the tray.

It will, of course, be obvious that separate cables might be connected to the respective cross members 34—38 instead of extending a pair of cables from one member 34 around the free end of its tray and to the proper cross member 38.

Each of the lower trays is provided near its upper end and near its lower end with an upstanding depth gauge 42, which can be watched through the windows 16, so that the operator of the drier can know how to adjust the trays for controlling the depth and the uniformity of depth of the rice.

The cross members 34 serve as supports for the trays and also as windlasses. The cross members 38 and the cables serve as supports and means for adjustment for the lower ends of the trays.

The lower tray discharges upon a fluted feed roll 44 which is located above a spiral conveyor 46, which discharges into a cup elevator 48 by which the rice or grain is carried to any place of storage or back to the drier hopper. The fluted feed roll is operated by mechanism not here shown, which should preferably include a variable speed control. The adjustment of the speed of the feed roll 44 and of the positions and angles of the trays, is preferably made after the drier starts. This is because the moisture content and condition of the grain and the variety of products being dried influence the speed of flow and the flow depth. By controlling the feed roll 44, it is possible to quite accurately determine the length of retention of the rice in the drier.

We should perhaps mention that the conveyor 46 is also driven by power means including variable speed mechanism of any suitable kind, not in itself forming part of our invention.

Hot air may be supplied to the intake 19 in any suitable way.

We preferably maintain the mouth of the conveyor chamber above the fluted roll 44 at the same size. In order to prevent loss of rice or the like when the lower tray 30 is slid upwardly, we hinge a metal plate or gate 49 to the wall of the conveyor chamber and connect the upper end of that plate or gate to the bottom of the tray 30 by a cable 51.

We have shown here a furnace 52 heated by an ordinary automatic blow-type oil burner 54 and supplying hot air to the tower through the piping 56. By providing the by-pass 58, any proportion of the air passing the blower of the burner may be passed through or around the furnace for thus in part controlling the temperature of the air supplied to the drier.

At 60, we have shown a thermostat which may be used to control the heat supply according to the temperature in the tower by any conventional mechanism. We use a variety of controls, including a temperature limit control, preferably in the air duct between the furnace and the drier for automatically shutting off the burner if the temperature goes above 150° Fahrenheit. We also use other controls, but these controls we have not shown in our drawing, because they are standard and involve merely the adaptation of known facilities to our purpose.

By means of the features described and these controls, the operation of the drier may be continuous and automatic to the extent that an operator is needed only at infrequent intervals. The rice or other material being dried can be run through the drier as many times as may be desired.

We find that in drying rice by this drier, we have been able to reduce the amount of labor necessary to harvest and condition the rice, thereby decreasing harvesting cost. Likewise we have increased the quality and uniformity of the product. We have provided a drier which can be used with various crops. With a little experience the drier can be used for soy beans and numerous other grain and seed products. We have found that for drying rice for example the data in United States Department of Agriculture, Circular No. 292, entitled "Artificial Drying of Rice on the Farm" may be followed to advantage.

Changes may be made in the arrangement and construction of the various parts of our drier, without departing from the real spirit and purpose of our invention, and it is our intention to cover by our claims, any modified forms of construction or use of mechanical equivalents, which may be reasonably included within their scope.

We claim as our invention:

1. In a drier, a tower, a series of vertically spaced inclined trays therein one of which has its lower end adjacent the tower wall, another having its lower end adjacent the next lower tray bottom, a grain-engaging member adjacent the lower end of a third tray, means for slidably adjusting the trays toward and from the elements against which they discharge for regulating the depth of material therein, and means for adjusting the trays to vary their angle of inclination for maintaining uniformity of depth of the material on each tray.

2. In a drier, a tower, a series of vertically spaced inclined trays therein, said drier having parts arranged to engage grain near the lower ends of the respective trays, means for slidably adjusting the trays toward and from said parts for regulating the depth of material therein, said means including a rotatable cross member for supporting the upper end of each tray and adapted to be rotated to function as a windlass, flexible members wound on the cross members and extending beneath the trays to their lower ends and anchored above the lower ends of the trays.

3. In a drier, a tower, a series of vertically spaced inclined trays therein, a rotatable cross member supporting the upper end of each tray lengthwise, means for supporting the lower end of each tray to permit the tray to slide, and rope means or the like wound on the cross member and connected to the tray, whereby the cross member may function as a windlass to slidably adjust the tray.

4. In a drier, a tower, a series of vertically spaced inclined trays therein, means for slidably adjusting the trays for varying the spacing of their lower ends from adjacent trays for regulating the depth of material thereon, means for adjusting each tray to vary its angle of inclination for maintaining uniformity of depth of the material on each tray, a cross member below the upper end of each tray affording a support on which the upper end of a tray may rock, each cross member being rotatable to form a windlass and comprising a part of said first means.

5. In a tower type drier, a series of vertically spaced trays inclined relative to the horizontal, and successive trays arranged to incline oppositely, means for pivotally supporting each tray at one end to vary its inclination relative to the horizontal and for adjusting the lower end of each tray slidably relative to the upper end of the next successive tray for varying the size of the discharge opening at said lower end, a conveyor for receiving the material discharged from the lowermost tray, a plate pivoted adjacent the conveyor for guiding material from the lowermost tray to the conveyor, and flexible means for connecting said plate to the last tray to permit of adjusting the inclination of said last tray.

KYLE ENGLER.
EDGAR L. BARGER.
REBECCA GEORGE THOMPSON,
*Administratrix of the Estate of Arthur H. Thompson, Deceased.*